1

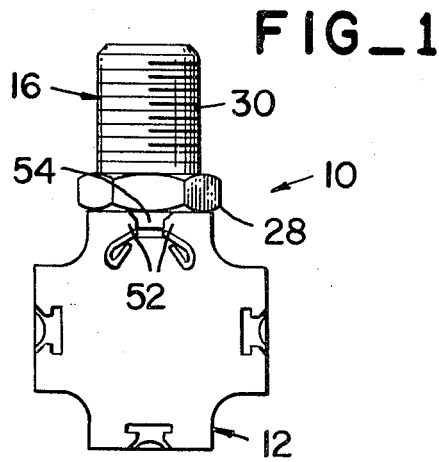
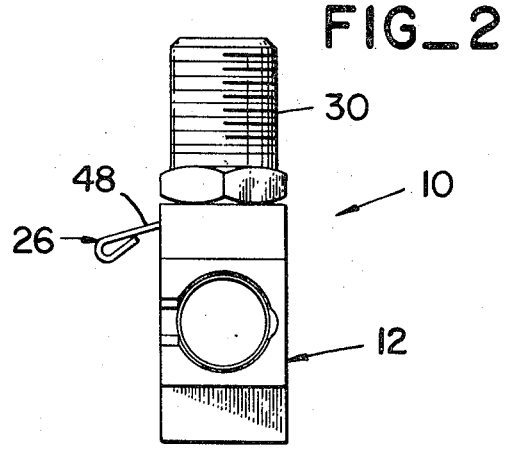
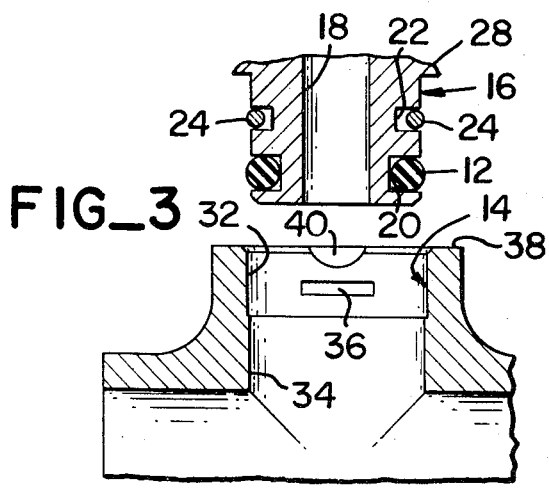
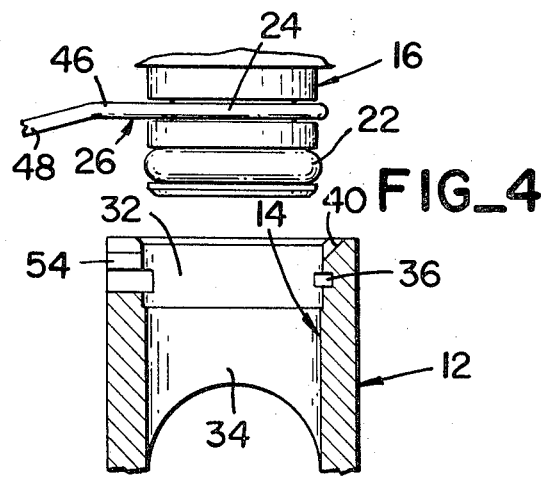
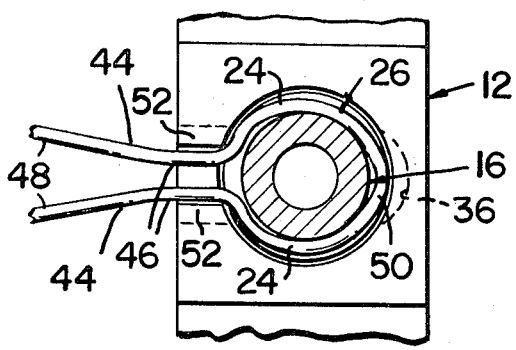
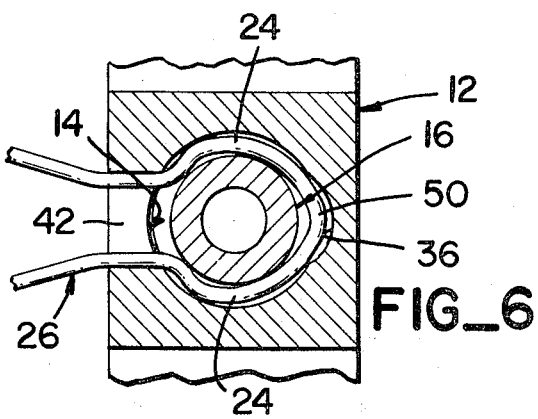
INVENTOR.
CHARLES H. GRAHAM

United States Patent Office 3,523,701
Patented Aug. 11, 1970

3,523,701
COUPLING UNIT
Charles H. Graham, Mountain View, Calif., assignor to Gra-Tec, Inc., Los Altos, Calif., a corporation of California
Filed Nov. 24, 1967, Ser. No. 685,567
Int. Cl. F16l 37/08
U.S. Cl. 285—150          4 Claims

ABSTRACT OF THE DISCLOSURE

A coupling unit having a male member receivable within the bore of a female member, the latter being provided with a pair of spaced recesses for receiving portions of a spring clip carried by the male member. The spring clip has a bight receivable within one of the recesses and a pair of sides receivable within another recess in the female member. Shoulder structure holds the sides from being separated from the other recess whereby the male and female members are releasably coupled together by a 3-point contact of the spring clip with the female member.

---

This invention relates to improvements in connecting two components together and, more particularly, to an improved coupling unit which connects a female member to a male member with a simple spring clip.

The present invention is directed to a coupling unit having a wire-like spring clip carried in a groove on the outer surface of a male member which is to be connected to a female member. To this end, the spring clip has a pair of sides connected together by a bight and the sides are shiftably received within the groove of the male member. The female member is provided with a bore and a pair of spaced recesses communicating with the bore. One of the recesses receives the bight and the other recess receives the sides of the clip. The other recess has an open end through which sides of the clip pass when the male member is inserted into the female member. To hold the sides in the other recess, a pair of projections or shoulders extend across the open end and are disposed to prevent removal of the sides from the other recess. However, the shoulders are sufficiently far apart to allow the sides to be removed from the other recess when the sides are urged so that they become aligned with the open end of the other recess. This action also deforms the spring clip so that the bight is drawn toward the male member and thereby out of the first-mentioned recess.

Thus, the spring clip of the present invention provides a connection utilizing 3-point contact between the female member and the clip to thereby releasably hold the male member and female members in coupled relationship. In this way, the female member does not need a relatively long groove in its bore so that machining costs in the manufacture of the female member is significantly reduced over that of prior coupling units using spring clips. This feature also allows the side wall of the female member to be relatively strong so that both the male member and the female member can be relatively small in size.

The aforesaid construction further allows the spring clip to be carried by the male member while at the same time the male member is allowed to rotate in the bore of the female member even while the members are connected together. Still another feature of the invention is that the clip requires very little space to function properly and projects only a slight distance outwardly of the female member when the members are connected together.

While the present invention is suitable for a number of different applications, it is especially adapted for use in connecting components together in a fluid flow network of the type utilizing a distribution block having a number of bores extending thereinto and communicating with each other interiorly of the block. When fittings are inserted in the various bores of the block, a wide variety of fluid flow configurations can be readily formed. The present invention, therefore, allows the quick connection and disconnection of the fittings with the distribution block while providing a simple way of holding each fitting releasably connected to such a block. The invention therefore is adapted for use with distribution blocks and connecting male members of standard sizes. Moreover, the spring clip of the invention allows for the interchangeability of the fittings in the block as desired.

The primary object of this invention is to provide an improved coupling unit having a spring clip carried by a male member receivable within the bore of a female member wherein portions of the spring clip are receivable within a pair of spaced recesses in the female member to provide a multiple-point holding action for releasably coupling the male member to the female member.

Another object of this invention is to provide a coupling unit which is simple and rugged in construction, can be formed with a minimum or machining of the parts, and can be adapted for fluid flow systems utilizing a distribution block having a number of interconnecting bores for receiving fluid flow lines.

Still another object of this invention is to provide a coupling unit of the type described wherein the female member has a pair of opposed recesses, a first of which has an open end adjacent to shoulder structure for receiving the sides of the spring clip carried by the male member, so that the clip will enter the first recess and will be held by the shoulder structure as another part of the clip is received in the second recess to define a three-point holding action between the spring clip and the female member.

Other objects of this invention will become apparent as the specification progresses reference being had to the accompanying drawing for an illustration of a preferred embodiment of the coupling unit.

In the drawing:

FIG. 1 is a side elevational view of the coupling unit with the male member inserted in the female member;

FIG. 2 is an elevational view of the coupling unit;

FIG. 3 is an enlarged fragmentary cross sectional view of the coupling unit with the male member about to be inserted into the female member;

FIG. 4 is a view similar to FIG. 3 but looking in a direction 90 degrees from the view of FIG. 3.

FIG. 5 is a cross sectional view showing the way in which the spring clip is deformed to allow the male member to enter the female member; and FIG. 6 is a view similar to FIG. 5 and showing the way the spring clip holds the member connected together.

While the teachings of the present invention can be used to interconnect male and female members of different types, the invention will, for purposes of illustration, only, be hereinafter described with respect to a coupling unit 10 of the type having a female member comprising a distribution block 12 provided with a number of interconnected bores 14 extending thereinto from respective outer side faces thereof. Block 12 can be utilized with one or more fittings or male members such as the fitting shown in FIGS. 1–4 and denoted by the numeral 16. Fitting 16, as shown, has a bore 18 therethrough for communicating with a corresponding bore of block 12. However, fitting 16 may be constructed in any manner, such as to define a closure or plug for a bore 14.

Fitting 16 is further provided with a pair of grooves 20 and 22 in its cylindrical outer surface, the grooves being annular and axially spaced apart. Groove 20 has an annular, resilient sealing member or O-ring 22 therein, while groove 22 shiftably receives the sides 24 of a resilient spring clip 26. Fitting 16 has a hexagonal stop 28 for limiting the inward travel of the fitting within block 12 and for providing a tool engaging portion to facilitate the coupling of the threaded outer portion 30 of the fitting to other structure.

Each bore of block 12 has an outer section 32 and an inner section 34, the latter having a diameter slightly less than that of section 32. The purpose for this feature is to assure proper sealing action between O-ring 22 and block 12 when fitting 16 is in an operative position within a bore 14. To this end, section 34 will have a diameter to cause the O-ring to be compressed as it is inserted from section 32 into section 34.

Bore section 32 is provided with an arcuate recess 36 spaced inwardly from the outer end face 38. An inclined face 40 extends a slight distance inwardly of end face 38 toward recess 36.

On the opposite die of section 32 of each bore, block 12 has a second, open end recess 42 for receiving the arms 44 of spring clip 26. These arms are extensions of sides 24 and are defined by parallel stretches 46 and inclined stretches 48. Also, clip 26 has a bight 50 which normally projects slightly outwardly of fitting 16 (FIGS. 4 and 6).

A pair of projections 52 are integral with block 12 and extend into the open end of each recess 42. These projections limit the size of the passageway 54 through which arms can enter recess 42. Projection 52 further define shoulders which confine arms 44 in recess 42 as shown in FIGS. 1 and 6 when fitting 16 is in an operative position in the corresponding bore.

When arms 44 are confined in recess 42, bight 50 extends into recess 36. Thus, there will be a three-point contact between the spring clip with block 12 to thereby releasably hold fitting 16 in an operative position in the bore.

While sides 24 of clip 26 are shown in FIG. 3 as being transversely circular, they could be shaped differently, if desired. For instance, a square cross section for sides 24 would provide greater surface contact with the sides of groove 22 to thereby increase the holding force exerted by the slip on fitting 16. Also, a square cross section would increase the strength of the clip.

In use, spring clip 26 is mounted on fitting 16 so that it extends partially into groove 22 as shown in FIG. 3. to connect fitting 16 with block 12, arms 48 are urged together as shown in FIG. 5 until stretches 46 are close enough together to pass through passageway 54.

When arms 44 of clip 26 are urged into the position shown in FIG. 5, spring clip 26 is slightly deformed so that bight 50 is urged closer to fitting 16. Then, as the fitting is moved into the corresponding bore 14, arms 44 become aligned with and are received in recess 42 while bight 50 becomes aligned with recess 36. Passageway 54 is substantially Y-shaped as shown in FIG. 1 to guide arms 44 toward passageway 54.

After the fitting has been moved into its operative position within the bore, arms 44 are then released and then bight 50 moves outwardly and into recess 36 while the arms 44 spread apart and engage opposite sides of recess 42 as shown in FIG. 6. Arms 44 are confined by projections 52 so that spring clip 26 is held at three points against movement away from block 12. Since sides 24 of clip 26 are within groove 22, fitting 16 is thereby releasably held in block 12.

To separate fitting 16 from block 12, arms 44 are again urged toward each other until stretches 46 can pass through passageway 54. At the same time, bight 50 is urged out of recess 36, whereupon the fitting can then be pulled out of the bore and thereby be separated from block 12.

Coupling unit 10 provides a simple and rugged construction for holding fitting 16 in block 12. It is also adapted for a wide variety of uses and those skilled in the art will recognize that the invention is not limited to the fitting construction described herein.

The construction of coupling unit 10 provides a number of advantages which permit the unit to be made at minimum cost and in a minimum of time using simple machining techniques. For instance, block 12 can be machined or otherwise constructed so that recesses 36 and 42 can be made in a single operation. A machining tool can be advanced through one face of the block to form recess 42 and then be moved across the corresponding bore 14 and into the block to form recess 36. Passageway 54 can then be formed in the block by a second operation.

Another advantage of the invention is that no relatively long groove is formed in block 12 for receiving the sides of the spring clip. Thus, the wall of the block will not be weakened so that the various components can be made relatively small in size to adapt the coupling unit to any one of a number of different fluid flow systems.

Still a further advantage resides in the fact that spring clip 26 can not only be used with a number of different types of fittings, but also it can be used interchangeably in the various bores of block 12. In this way, the clip can be carried by a particular fitting and used at all times with such fitting to couple the latter to the block regardless of which of the bores receives the fitting.

While one embodiment of this invention has been shown and described, it will be apparent that other adaptations and modifications can be made without departing from the true spirit and scope of the invention.

What is claimed is:

1. A coupling unit comprising: a female member having an inner wall defining a cylindrical bore section extending thereinto from an outer face thereof; a male member receivable within said bore, said female member having a pair of diametrically opposed recesses communicating with said bore, one of the recesses having an open end at said outer face of the female member, and the other of the recesses being arcuate and formed in the bore wall and being of such circumferential extent that it terminates short of said one recess, said male member having groove structure on the outer surface thereof; a spring clip having a pair of sides carried in said groove structure and being receivable in said one recess through said open end thereof when said male member is inserted in said bore and when the sides of the clip are urged toward each other, said clip having a radially outwardly extending portion alignable with and positioned radially inwardly from said other recess when the male member is positioned within the female member and the clip sides are sufficiently urged toward each other and receivable in said other recess when the sides are released; and means for releasably retaining said sides of the clip in said one recess.

2. A coupling unit comprising: a male member having a generally cylindrical outer surface provided with a groove; a spring clip carried by the male member and having a pair of spaced sides shiftably received within said groove and a radially outwardly extending bight interconnecting the sides, said bight normally projecting outwardly from said male member and movable toward the same when said clip sides are urged toward each other; a female member having an inner wall defining a generally cylindrical bore section for receiving said male member and a pair of diametrically opposed recesses, one of the recesses being disposed to receive said bight and the other recess being disposed for receiving said clip sides when the male member is inserted in said bore; said one recess being arcuate and formed in the bore wall and being of such circumferential extent that it terminates short of said other recess, and means defining a passageway into said other recess for admitting said clip thereinto when said clip sides are urged toward each other, said means being disposed to hold the clip sides in said other recess when said clip sides are released.

3. A coupling unit comprising: a male member having a generally cylindrical outer surface provided with a groove therein; a female member having an inner wall defining a generally cylindrical bore section for receiving said male member and provided with means defining a pair of spaced shoulders and an open end recess for each shoulder respectively, there being a third recess in said bore and spaced from said shoulders and substantially diametrically opposed from said shoulder recesses; said third recess being arcuate and formed in the bore wall and being of such circumferential extent that it terminates short of said shoulder recesses, a spring clip having a pair of sides at least partially disposed within said groove and a radially outwardly projecting bight interconnecting the sides, said bight normally projecting outwardly from said male member and into said third recess when the male member is in an operative position within said bore, said clip sides being yieldable relative to each other to permit the same to be moved into respective recesses through the open ends thereof as the male member moves into said operative position, said shoulders retaining said clip sides against movement out of respective recesses when the male member is in said operative position, whereby said members are releasably coupled together.

4. A coupling unit comprising: a fitting and a distribution block, the fitting having a cylindrical outer surface and provided with a pair of axially spaced, annular grooves therein, the groove adjacent to one end of the fitting having an annular resilient sealing member therein, said distribution block having a number of generally cylindrical bores extending thereinto and in communication with each other, said bores being adapted to interchangeably receive said fitting, each bore being defined by an inner wall having an outer portion and an inner portion, the diameter of the outer portion being greater than the diameter of the inner portion, said sealing member being in engagement with the inner portion when the fitting is disposed in an operative position within a bore, said distribution block having a pair of spaced recesses for each bore respectively, one recess being formed in said outer bore portion and the other recess extending through the distribution block in substantially diametrically opposed relationship to said one recess; said one recess being arcuate and formed in the bore wall and being of such circumferential extent that it terminates short of said other recess, a spring clip having a pair of sides and a radially outwardly projecting bight interconnecting the sides, the spring clip being disposed partially on the fitting with the sides of the clip being shiftably received within the other groove thereof, said fitting being insertable within a bore when said sides are urged toward and into proximity with each other with the clip sides being movable into the open end of the other recess of the bore and with said bight being movable into said one recess when the clip sides are released; and a pair of projections disposed across the open end of each of said other recess of the bore and with said bight being movable into said one recess when the clip sides are released; and a pair of projections disposed across the open end of each of said other recesses and being spaced apart sufficiently to admit the clip sides into said other recess, whereby said projections define a pair of shoulders which bar the removal of said arms from said other recess when the clip sides are released.

References Cited

UNITED STATES PATENTS

| 472,342 | 4/1892 | Draudt | 285—321 X |
|---|---|---|---|
| 1,289,867 | 12/1918 | Moore. | |
| 2,624,090 | 1/1953 | Jones | 24—217 |
| 3,085,820 | 4/1963 | Pollia | 85—8.8 X |
| 3,215,455 | 11/1965 | Fiala et al. | 285—321 X |

FOREIGN PATENTS 836,317   6/1960   Great Britain.

DAVE W. AROLA, Primary Examiner

U.S. Cl. X.R.

285—305